F. W. BENJAMIN.
Potato-Digger.
No. 209,641.          Patented Nov. 5, 1878.
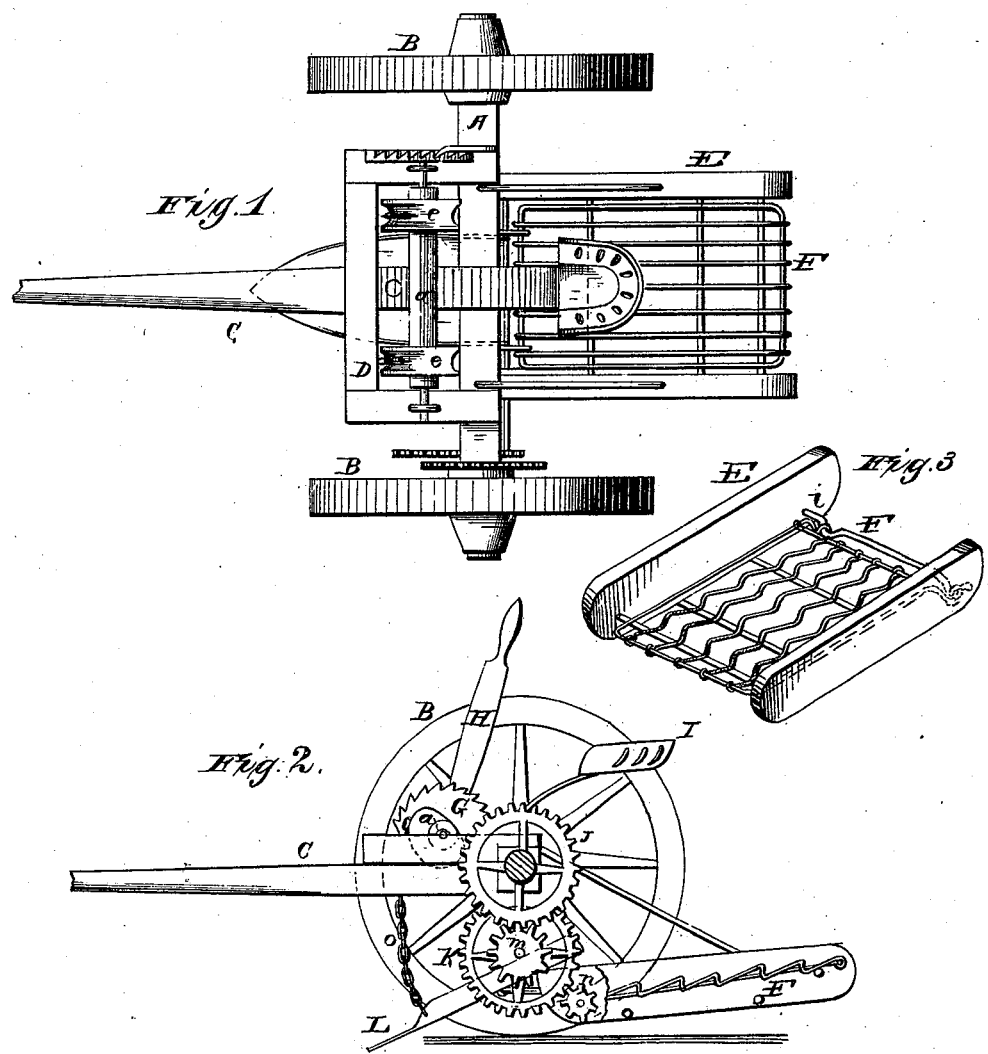

UNITED STATES PATENT OFFICE.

FRED. W. BENJAMIN, OF SHEFFIELD, OHIO.

IMPROVEMENT IN POTATO-DIGGERS.

Specification forming part of Letters Patent No. 209,641, dated November 5, 1878; application filed August 23, 1878.

*To all whom it may concern:*

Be it known that I, FRED. W. BENJAMIN, a resident of Sheffield, in the county of Ashtabula, and in the State of Ohio, have invented certain new and useful Improvements in Potato-Diggers; and do hereby declare that the following is a full, clear, and exact description thereof, reference being had to the accompanying drawings, and to the letters of reference marked thereon, making a part of this specification.

The nature of my invention consists in the construction and arrangement of the several parts of a potato-digger, the peculiarities of which will be hereinafter more particularly described.

To enable those skilled in the art to make and use my invention, I will proceed to describe its construction and operation.

In the accompanying drawings, making part of this specification, Figure 1 represents a plan view; Fig. 2, a side view with one wheel removed, and Fig. 3 a perspective of the shaker.

In the figures, A represents the axle of the machine, which is supported by the wheels B B. C represents the tongue of the machine. Upon the axle A is the frame-work D, and lying across this frame, and having bearings in it, is a shaft, $a$, which is provided at each end with a pulley or grooved wheel, $e$. A cord or chain, $o$, having one end attached to one of these pulleys, passes down and has its other end secured to one side of the shovel L. This shovel has its rear end hinged to a frame, E, which carries a shaker, as will be set forth. The forward end of the shovel is regulated by the cords or chains $o$, one being secured to each side of it. The object of the shovel is to pass under the potatoes, remove them from the ground, and convey them back to the shaker.

The forward point of the shovel is raised or lowered by the chains, said chains being controlled and regulated by means of the lever H, which is held in place by the ratchet-segment G. Beneath the axle, and in rear of the shovel L, is a frame, E, in which is placed an open wire shaker, F, the rims of same being corrugated vertically. The rear end of the shaker-frame rests and plays upon a cross-piece at the rear of frame E, while its forward end, which lies under the shovel, is connected to a crank-shaft, $i$, in such manner that when the said shaft is rotated the shaker-frame has at one end a reciprocating and at the other a rotary and reciprocating movement. A pinion, $n$, upon the end of the crank-shaft $i$ connects with a gear-wheel, K, which is supported beneath the axle upon a suitable shaft, and secured to the wheel K is a pinion, $m$, which gears into a wheel, J, which, having the main axle as a journal, and connected to one of the wheels B, revolves therewith. When the wheels B revolve, motion is communicated through the gear-wheels and pinions just mentioned to the shaker-frame F, so that when the potatoes are landed upon it from the shovel L the dirt is freed from them and passes through the openings between the wires, while the potatoes pass over the shaker and are dropped behind the machine.

Having thus fully described my invention, what I claim as new, and desire to secure by Letters Patent, is—

In a potato-digger, the combination, with the axle A, having the cog-wheel J, of the pinion $m$, cog-wheel K, pinion $n$, and the frame E, provided with open wire shaker F, composed of vertically-corrugated wires, and connected with the crank-shaft $i$, said shaker resting on the inclined portion of the rods or wires, whereby the rear end of the separator is vibrated vertically, substantially as herein set forth.

In testimony that I claim the foregoing I have hereunto set my hand this 29th day of June, 1878.

FRED. W. BENJAMIN.

Witnesses:
J. J. McCARTHY,
W. A. LACKEY.